US009443373B2

(12) United States Patent
Delbreil et al.

(10) Patent No.: US 9,443,373 B2
(45) Date of Patent: Sep. 13, 2016

(54) BEVERAGE PREPARATION MACHINE COMPRISING AN EXTENDED USER-ADVISORY FUNCTIONALITY

(75) Inventors: Marc Delbreil, Bulle (CH); Fabien Ludovic Agon, Le Bouveret (CH)

(73) Assignee: Nestec S.A., Vevey (CH)

( * ) Notice: Subject to any disclaimer, the term of this patent is extended or adjusted under 35 U.S.C. 154(b) by 525 days.

(21) Appl. No.: 13/513,774

(22) PCT Filed: Nov. 30, 2010

(86) PCT No.: PCT/EP2010/068473

§ 371 (c)(1), (2), (4) Date: Jun. 4, 2012

(87) PCT Pub. No.: WO2011/067227

PCT Pub. Date: Jun. 9, 2011

(65) Prior Publication Data

US 2012/0240780 A1 Sep. 27, 2012

(30) Foreign Application Priority Data

Dec. 2, 2009 (EP) .................................... 09177744

(51) Int. Cl.

*A47J 31/06* (2006.01)
*G07F 13/06* (2006.01)

(Continued)

(52) U.S. Cl.

CPC ............. *G07F 13/065* (2013.01); *G07F 9/026* (2013.01); *G07F 11/002* (2013.01)

(58) Field of Classification Search

CPC .... G07F 9/026; G07F 11/002; G07F 13/065; A47J 31/02; A47J 31/053; A47J 31/52; A47J 31/407; B65D 85/8043

USPC ............... 99/280, 285, 295, 323; 705/26.81; 426/433

See application file for complete search history.

(56) References Cited

U.S. PATENT DOCUMENTS 4,377,049 A 3/1983 Simon et al.
4,458,735 A 7/1984 Houman (Continued)

FOREIGN PATENT DOCUMENTS

| | | |
|---|---|---|
| CH | 682798 | 11/1993 |
| DE | 4429353 | 2/1996 |

(Continued)

OTHER PUBLICATIONS

Written Opinion and International Search Report issued Mar. 15, 2011 for corresponding Intl. Appln. No. PCT/EP2010/068473.

(Continued)

*Primary Examiner* — Dana Ross
*Assistant Examiner* — Lindsey C Teaters
(74) *Attorney, Agent, or Firm* — K&L Gates LLP

(57) ABSTRACT

The present invention relates to a beverage preparation machine (1) having an extended user-advisory functionality, comprising a control unit (21) for recognizing an actual or upcoming event triggering said user-advisory functionality, such as a disturbance of such machine (1) based on monitored machine parameters or a machine contextual event, a communication module (11) for communicating with a remote external device (50) via a communication network (501, 511), and a display (10) for displaying messages, wherein the control unit (21) in said user-advisory functionality is further adapted to establish a connection via the communication module (11) to said external device (50) offering a resource for managing the actual or upcoming event, and to control the display of a message on the display (10) indicating the actual or upcoming event and advising a user on managing said event. The present invention further relates to a program stored on a memory device and executable by a control unit (21) of the beverage preparation machine (1) for providing an extended user-advisory functionality for a beverage preparation machine (1).

15 Claims, 6 Drawing Sheets

(51) Int. Cl.

| | |
|---|---|
| ***G07F 9/02*** | (2006.01) |
| ***G07F 11/00*** | (2006.01) |

(56) References Cited

U.S. PATENT DOCUMENTS

| | | | | |
|---|---|---|---|---|
| 4,554,419 | A | 11/1985 | King et al. | |
| 4,767,632 | A | 8/1988 | Meier | |
| 4,954,697 | A | 9/1990 | Kokubun et al. | |
| 5,312,020 | A | 5/1994 | Frei | |
| 5,335,705 | A | 8/1994 | Morishita et al. | |
| 5,372,061 | A | 12/1994 | Albert et al. | |
| 5,375,508 | A | 12/1994 | Knepler et al. | |
| 5,645,230 | A | 7/1997 | Marogna | |
| 5,731,981 | A | 3/1998 | Simard | |
| 5,744,793 | A | 4/1998 | Skell et al. | |
| 5,836,236 | A | 11/1998 | Rolfes | |
| 5,959,869 | A | 9/1999 | Miller et al. | |
| 6,021,394 | A | 2/2000 | Takahashi | |
| 6,082,419 | A | 7/2000 | Skell et al. | |
| 6,182,555 | B1 | 2/2001 | Scheer et al. | |
| 6,354,341 | B1 | 3/2002 | Saveliev et al. | |
| 6,629,080 | B1 | 9/2003 | Kolls | |
| 6,759,072 | B1 | 7/2004 | Gutwein et al. | |
| 7,197,367 | B2 | 3/2007 | Brinkemper et al. | |
| 7,889,182 | B2 | 2/2011 | Romanyszyn et al. | |
| 7,950,424 | B2 | 5/2011 | Ozanne et al. | |
| 8,032,251 | B2 | 10/2011 | Monn | |
| 8,359,968 | B2 | 1/2013 | Denisart et al. | |
| 8,364,321 | B2 | 1/2013 | Kollep | |
| 8,777,103 | B2 | 7/2014 | Doglioni Majer | |
| 8,887,622 | B2 | 11/2014 | Bentley et al. | |
| 8,960,077 | B2 | 2/2015 | Doglioni Major | |
| 2003/0008053 | A1 | 1/2003 | Singh | |
| 2003/0070555 | A1 | 4/2003 | Reyhanloo | |
| 2005/0127098 | A1* | 6/2005 | Bertone | A47J 31/41 222/129.1 |
| 2005/0236253 | A1 | 10/2005 | Shur | |
| 2006/0009363 | A1 | 1/2006 | Crews | |
| 2006/0124659 | A1 | 6/2006 | Mosconi et al. | |
| 2006/0188620 | A1* | 8/2006 | Gutwein | A63F 5/243 426/433 |
| 2007/0068393 | A1 | 3/2007 | Nosler et al. | |
| 2007/0157820 | A1 | 7/2007 | Bunn | |
| 2008/0121639 | A1 | 5/2008 | Dohnert et al. | |
| 2008/0262648 | A1 | 10/2008 | Kriston et al. | |
| 2009/0219140 | A1 | 9/2009 | Guard et al. | |
| 2009/0293733 | A1 | 12/2009 | Martin et al. | |
| 2014/0202591 | A1 | 7/2014 | Schnyder | |

FOREIGN PATENT DOCUMENTS

| | | |
|---|---|---|
| DE | 20200419 | 5/2002 |
| DE | 202006019039 | 3/2007 |
| FR | 2624844 | 6/1989 |
| GB | 2397510 | 7/2004 |
| JP | 2003192096 | 7/2003 |
| WO | 0212112 | 2/2002 |
| WO | 2005079638 | 9/2005 |
| WO | 2006050563 | 5/2006 |
| WO | WO2007003990 | 1/2007 |

OTHER PUBLICATIONS

Japan Office Action for Application No. P2012-541454, Dispatch No. 052857, dated Feb. 3, 2015, 7 pages.

Australia Office Action for Application No. 2010326813, dated Dec. 1, 2015, 5 pages.

* cited by examiner

BEVERAGE PREPARATION MACHINE COMPRISING AN EXTENDED USER-ADVISORY FUNCTIONALITY

CROSS REFERENCE TO RELATED APPLICATIONS

The present application is a National Stage of International Application No. PCT/EP2010/068473, filed on Nov. 30, 2010, which claims priority to European Patent Application No. 09177744.1, filed on Dec. 2, 2009, the entire contents of which are being incorporated herein by reference.

FIELD OF THE INVENTION

The field of the invention relates to a beverage preparation machine comprising an extended user-advisory functionality as well as a computer program product for a beverage preparation machine.

For the purpose of the present description, a “beverage” is meant to include any liquid food, such as tea, coffee, hot or cold chocolate, milk, soup, baby food or the like. A “capsule” is meant to include any pre-portioned beverage ingredient within an enclosing packaging of any material, in particular an air tight packaging, e.g. plastic, aluminum, recyclable and/or bio-degradable packaging and of any shape and structure, including soft pods or rigid cartridges containing the ingredient.

BACKGROUND ART

Certain beverage preparation machines use capsules containing ingredients to be extracted or to be dissolved; for other machines, the ingredients are stored and dosed automatically in the machine or else are added at the time of preparation of the drink.

Most coffee or other beverage preparation machines possess filling means that include a pump for liquid, usually water, which pumps the liquid from a source of water that is cold or indeed heated through heating means, such as a heating resistor, a thermoblock or the like. Such filling means are usually controlled via a control unit of the machine, typically including a printed circuit board with a controller.

For allowing the user to interact with such machines, for providing operation instructions to the machine or obtaining feed-back there from, various systems have been disclosed in the art, for instance as mentioned in the following references: AT 410 377, CH 682 798, DE 44 29 353, DE 202 00 419, DE 20 2006 019 039, DE 2007 008 590, EP 1 302 138, EP 1 448 084, EP 1 676 509, EP 08155851.2, FR 2 624 844, GB 2 397 510, U.S. Pat. No. 4,377,049, U.S. Pat. No. 4,458,735, U.S. Pat. No. 4,554,419, U.S. Pat. No. 4,767,632, U.S. Pat. No. 4,954,697, U.S. Pat. No. 5,312,020, U.S. Pat. No. 5,335,705, U.S. Pat. No. 5,372,061, U.S. Pat. No. 5,375,508, U.S. Pat. No. 5,731,981, U.S. Pat. No. 5,645,230, U.S. Pat. No. 5,836,236, U.S. Pat. No. 5,959,869, U.S. Pat. No. 6,182,555, U.S. Pat. No. 6,354,341, U.S. Pat. No. 6,759,072, US 2007/0157820, WO 97/25634, WO99/50172, WO 2004/030435, WO 2004/030438, WO 2006/063645, WO 2006/090183, WO 2007/003062, WO 2007/003990, WO 2008/104751, WO 2008/138710, WO 2008/138820 and WO 2009/016490.

Nowadays beverage preparation machines provide an increasing number of different functionalities. This makes the beverage preparation machines of more interest and of a higher value for the user but on the other hand makes it more difficult for the user to maintain the machine and to monitor all the functionalities.

SUMMARY OF THE INVENTION

It is therefore an object of the present invention to improve the prior art.

Specifically, it is an object of the present invention to provide a beverage preparation machine comprising an extended help functionality as well as a program for providing an extended help functionality for a beverage preparation machine, which allow to aid the user with respect to maintenance and functionality of the machine. It is an object of the present invention to provide a beverage preparation machine comprising means for guiding the user to perform maintenance tasks related to its beverage preparation machine, and more particularly related to the preventive maintenance tasks for preventing upcoming disturbances. It is further an object of the present invention to provide such a beverage preparation machine and program, which make the handling of the beverage preparation machine for the user easy and simple. It is a further object to provide such a machine and program which allows to shift the workload regarding the maintenance and monitoring of the beverage preparation machine away from the user. It is further an object of the present invention to provide such a beverage preparation machine adapted to help the user, facing multiple choices between a plurality of resource suppliers for managing an actual or upcoming event, to select an appropriate supplier to deal with said event.

According to a first aspect the present invention relates to a beverage preparation machine having an extended user-advisory functionality, comprising a control unit for recognizing an actual or upcoming event triggering said user-advisory functionality, such as a disturbance of such machine based on monitored machine parameters or a machine contextual event, a communication module for communicating with a remote external device via a communication network, and a display for displaying messages, wherein the control unit in said user-advisory functionality is further adapted to establish a connection via the communication module to said external device offering a resource for managing the actual or upcoming event, and to control the display of a message on the display indicating the actual or upcoming event and advising a user on managing said event.

According to a further aspect the present invention relates to a program on a memory device for a beverage preparation machine for providing an extended user-advisory functionality, wherein said program when being executed is arranged to perform the steps of recognizing an actual or upcoming event triggering said user-advisory functionality, such as a disturbance of such machine based on monitored machine parameters or a machine contextual event, establishing a connection via a communication module to a remote external device offering a resource for managing the actual or upcoming event, and displaying a message on the display indicating the actual or upcoming event and advising the user on managing said event.

The program for providing an extended user-advisory functionality comprise electronic data-processing program code instructions, intended to be executed by a processing unit such a processor or a controller. Consequently, the invention relates also to programs on an information support, for providing an extended user-advisory functionality. These programs may use any programming language, and may be in the form of source code, object code, or intermediate code between source code and object code, such partially compiled code, or any suitable other form.

The invention relates also to an information support readable by a beverage machine, and on which are stored instructions of the programs as mentioned above. The information support may be any suitable device capable of storing said programs. For example, it may comprise storage means, comprising a CD-ROM, USB key, FLASH memories, or a ROM of a microelectronic circuit, or a magnetic storing means, like a floppy or hard drive. Moreover, the information support may be a transmissible support, such as an electrical or optical signal, which can be transported by an optical or electrical wire, by radiofrequency means or by any suitable coupling means. The program may be in particular downloaded from a network connected to Internet.

The information support may also be an integrated circuit in which the programs are incorporated, the circuit being adapted to execute or to be used to execute these programs.

Further features, advantages and objects of the present invention will become evident by means of the figures of the enclosed drawings as well as by the following detailed explanation of illustrative-only embodiments of the present invention.

BRIEF DESCRIPTION OF THE DRAWINGS

The invention will now be described with reference to schematic drawings, wherein.

DETAILED DESCRIPTION

Figure 1A:
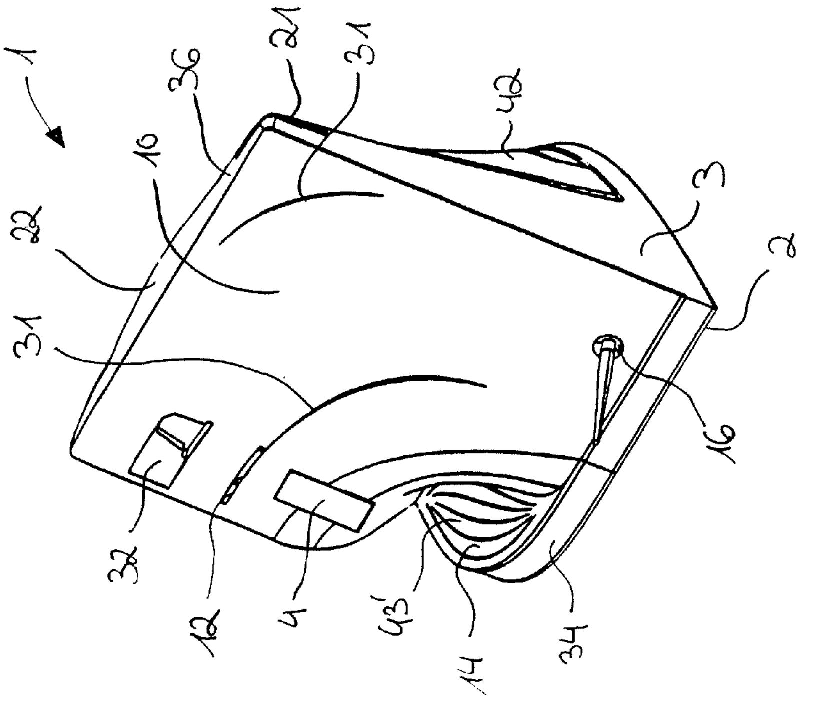
FIGS. 1*a*, 1*b*, 2*a* and 2*b* show different perspective views of a beverage preparation machine according to the present invention.

The machine according to the present invention can be a coffee, tea or soup machine, in particular a machine for supplying a beverage or liquid food by passing hot or cold water or another liquid through a capsule containing an ingredient of the beverage or liquid food to be supplied, such as ground coffee.

For example, the preparation machine comprises: an ingredient processing arrangement including one or more of a liquid reservoir, liquid circulation circuit, a heater, a pump and a beverage preparation unit arranged to receive capsules for use and evacuate capsules upon use; a housing having an opening leading into a seat to which capsules or pods are evacuated from the preparation unit; and a receptacle having a cavity forming a storage space for collecting capsules or pods evacuated to the seat into the receptacle to a level of fill. The receptacle is insertable into the seat for collecting capsules or pods and is removable from the seat for emptying the collected capsules or pods. Examples of such ingredient processing arrangements are disclosed in WO 2009/074550 and in WO 2009/130099, which are incorporated herein by reference.

The machine may include an interface as described in PCT/EP09/058,540 and/or be in a network for reordering capsules as described in EP 09169800.1.

The machine may comprise a user-interface screen for providing information to the user and/or for accepting input by the user. The user-interface screen can be a touch-sensitive screen and/or comprise touch-sensitive input parts. The machine may have a user-input device, such as a touch pad, one or more buttons and/or switches or similar devices known in the art. The user-interface screen can be stylus sensitive.

A stylus may for instance be used to select predefined options displayed on the interface-screen or to write notes and messages on the user-interface screen that may be stored by the machine and re-accessible later. Hence, the screen may be used as a substitution for a post-it. Hereby, it may be possible to select different colors when writing on the screen.

According to the present invention, the liquid food or beverage preparation machine has an interface for connection to a remote network, such as a network for accessing remote data displayable on the user-interface screen and/or for transferring local data acquired via the user interface screen, in particular a network for: supplying visual and/or audio information in relation with a liquid food or beverage that can be requested by the user; and/or for ordering, in particular from a remote supplier, goods such as liquid food or beverage ingredients or a service related to this machine by using the user-interface screen.

Hence, the user may be given the technical possibility to order directly through the beverage preparation machine liquid food or beverage ingredients that are missing or at a low level, or request directly through this machine the most up to date information on a particular item, in particular a liquid food or beverage he has requested or intends to request the machine to prepare or order from the supplier.

Moreover, the user-interface screen can be arranged to perform at least one function selected from: displaying information to the user regarding a parameter of the machine that requires a user intervention, displaying locally stored and/or remotely emitted graphic or text matter, a notepad function, and a visual ambiance generator, for instance by displaying appropriate pictures or moving color shapes, for instance of the screen-saver type.

In order to noticeably affect the ambiance surrounding the machine by visual effects, the user-screen has to dominate the user-visible part of the machine. An interface screen of small size and/or lost somewhere on the user-visible part of the machine will not provide an optimal ambiance effect.

Furthermore, the liquid food or beverage preparation machine may include a sound input and/or output device. The sound device can be arranged to cooperate with the user-interface screen, in particular a sound device arranged to cooperate functionally with the screen, such as a sound device for providing melodic acoustic feed back in reaction to a user-input on the user-interface screen and/or cooperating with the screen so that harmonious visual feed-back is generated on the user-interface screen in reaction to an audio signal. The sound device may include a voice recognition arrangement so as to be able to receive vocal user-commands and/or to link a particular user profile from a voice analysis.

For example, the user-interface screen may be arranged to display a movie, news, weather forecast, stock exchange information or anything alike while the machine is preparing a liquid food or beverage, so that the user does not have to wait until the liquid food or beverage is prepared to move on to such activities but can do them right from the beginning, with a comfortable interface screen whose functionalities go significantly beyond mere input and/or output of data.

Such liquid food or beverage preparation machines are particularly handy for preparing a liquid food or beverage during an on-going broadcasted radio or TV program. The user may thus get himself a liquid food or beverage while he is following such a program on an ordinary TV or radio and still continue to follow the program on the beverage preparation machine. Hence, the user will not be attempted to wait the end of the program or an advertising break. The beverage preparation machine may include a receiver that is capable of reacting to a remote control device, such as an IR or radio remote control device, in particular a remote control device compatible with a radio or television, so that the user may start-up the food or beverage preparation machine from a distance, in particular while he is sitting in front of his TV or nearby the radio. The liquid food or beverage preparation machines may of course be connected to a DVD or other media source so that the user can follow his favourite programs while he is preparing a liquid food or beverage.

The machine can be substantially formed by a main body having a rectangular front side being dominated by the user-interface screen and a foot portion larger than the top portion, so that the main body is tapering from the foot portion to the top portion. The main body may include at least one of: a drip tray having a support member for a receptacle to be filled with a liquid food or beverage, a capsule collector, and a liquid supply reservoir such as a water reservoir.

Moreover, the machine may have a liquid food or beverage outlet located above an area for receiving a receptacle to be filled, the outlet preferably being hidden by the user-interface screen. For instance, the outlet is located perpendicularly behind the user-interface screen. In fact, the entire area or a substantial part thereof can be located perpendicularly behind the user-interface screen.

Thus, in addition of providing a user-interface screen configuration on the machine that naturally and durably captures the user's attention, the machine's outlet, and optionally the receptacle located there under, may be hidden from the user's visual field so as avoid distraction of the user's attention by parts and/or operations of the machine other than those relating to the user-interface screen.

As already mentioned, the present invention relates to a machine connectable to a data-exchange network, the machine being configured for preparing a beverage in particular from a pre-portioned beverage ingredient within a capsule.

For this purpose, the machine comprises a communication module for connecting the machine to said network via a wired or wireless connection. The network to which the communication module is connectable may be the internet, an intranet, GSM network, UMTS network, Bluetooth network, infrared (IR) or a similar network to which one or more distant computers, servers and terminals are connected for communicating with the communication module of the beverage preparation machine. Hereby, the term "network" is intended to refer to a system comprising the machine according to the present invention and at least one further device, which are connected to each other via a communication link for one-directional or bi-directional communication. In case that a connection to more than one device is provided, the machine can also be connected to different devices via different types of communication networks.

Without controlling or participating to the control of the ingredient processing arrangement, the communication module may be configured in the beverage preparation machine to monitor certain aspects of the machine and, in particular, communicate such aspects onto the network to a remote server.

The machine further comprises a control unit for controlling all processes within the machine. In one embodiment, the control unit is arranged to communicate data to the communication module, the data relating to at least one of: the beverage preparation process; the ingredient processing arrangement; the control unit and/or beverage preparation settings. This information may then be communicated (or not) to a distant server and be processed for general or particular commercial or servicing or repair or counseling purpose.

In an even safer embodiment, the control unit is prevented from communicating with the communication module. In this case, the communication is not even unidirectional like above but inexistent. Hence, the control unit is configured to receive no signal at all from the communication module not even a signal for an information request. In this embodiment, no data communication channel is needed between the control unit and the communication module.

Typically, the ingredient processing arrangement comprises one or more sensors for measuring parameters of the status of the ingredient processing arrangement and/or the beverage preparation process. For instance, such sensors may include at least one of: temperature sensors, a pressure sensor, a flowmeter, an electric power sensor, an overheat sensor, a scale sensor, a water level sensor, an ingredient recognition sensor, etc. . . . . Such sensors are usually connected to the control unit.

In an embodiment, the communication module can be arranged to receive information from at least one of the sensor(s). The communication module may be directly connected to the sensors, usually in parallel to the control unit, or it may be indirectly connected to the sensor(s) via the control unit and typically be communicated a sensor-related information after processing by the control unit.

Normally, the control unit is connected to a beverage preparation user-interface. The user would use this user-interface to operate the ingredient processing arrangement via the control unit.

Typically, the communication module is connected to a communication user-interface. The user would use this user-interface to retrieve information from the network or retrieve information therefrom.

Such user-interfaces may include screens and touch screens, buttons, switches, etc. . . . as known in the art.

Preferably, the control unit is connected to a beverage preparation user-interface and the communication module is connected to a communication user-interface, the beverage preparation user-interface and the communication user-interface being juxtaposed. In particular, the beverage preparation user-interface can be flush with the communication user-interface. The beverage preparation user-interface and the communication user-interface may be disposed in a single user-interface canvas. Hence, the disposition of the user-interfaces may be such as to appear like a single interface providing all the user-access to the control unit and the communication module.

Whereas the control unit and the communication module may be digitally and/or physically, entirely or partly, separated within the machine, the corresponding user-interfaces may be configured as an apparent single interface. Hence, the user is confronted with a single or concentrated user-interface arrangement to avoid the dispersion of his/her attention all over the beverage preparation machine.

Typically, the beverage preparation machine comprises a housing for housing: the ingredient processing arrangement; the control unit; and the communication module. This housing would normally also bear the user-interfaces.

For instance, the communication module is arranged to receive from the network and communicate via user-communication means, such as a display and/or loudspeaker, information relating to at least one of: a need to carry out a particular service; a need to repair said machine; and information on a particular ingredient that is being processed in said machine. When the communication module is configured to monitor the machine operation and/or components of the machine, the corresponding information may be communicated to a distant server of the network for evaluation and generation of suggestions to the user, for instance, via the communication module. For example, via appropriate sensor systems, the communication module may monitor the ingredient consumption and suggest timely reordering when the stock of ingredient is low or send general information regarding the ingredient or beverage that is being processed for display on the machine. Instead of a mere suggestion to reorder ingredients, e.g. proportioned ingredients capsules, the system may be configured to proceed to automatic re-ordering when the ingredient stock is low.

The communication module may be arranged for remote monitoring of the service periods, for instance for carrying out a descaling process or for general maintenance. The communication module may communicate various parameters of the ingredient processing arrangement and the control unit for diagnosis purposes and/or for carrying out a market survey as to the user's preferences, for instance the actually used ratios of different ingredients. Hence, a distant server may monitor the preferred volume of beverage dispensing with certain ingredients, etc. . . . .

More generally, the communication module may be arranged to receive from the network and communicate via user-communication means, such as a display and/or loudspeaker, information relating to: handling of this type of machine by a user, e.g. provide an on-line user manual and/or beverage recipes; advertising relating to beverage preparation machines, accessories, one or more ingredients that are being processed or related products; general information relating to one or more ingredients for the beverage processing; and visualization and/or music for generating an ambiance relating to such beverages or preparations thereof or consumptions thereof; and news and/or weather forecast, etc. . . . . For example, the communication module with the appropriate user-interface may be configured to permit distant ordering of ingredients via the network.

The beverage preparation machine can be arranged to automatically monitor the capsule consumption and send a capsule order to the supplier server whenever the automatic monitoring indicates a reaching of a shortage of consumable ingredient capsules at the customer location, the supplier server being arranged to receive the capsule order and to generate a corresponding instruction to prepare a shipment of a new stock of capsules for supply to the customer.

The beverage preparation machine may be arranged to communicate automatically the capsule consumption to the supplier server that is arranged to automatically monitor the capsule consumption and to generate the above instruction.

The machine's capsule extraction unit can be arranged to receive different types of ingredient capsules for preparing different beverages. For example, the extraction unit is arranged for receiving different coffee capsules types selected from capsules of arabica, robusta, canefora, etc. . . . and blends thereof, e.g. the NESPRESSO™ capsule ranges of capsule types, of the in-home or the out-of-home beverage preparation machine standards.

In an embodiment, the beverage preparation machine has an automatic capsule recognition arrangement.

For example, the capsule recognition system is of the type disclosed WO02/28241 which discloses a coffee machine using capsules with a machine interpretable feature that can be read automatically by the machine via a sensor. The machine interpretable feature on the capsule may include one or more of a colour, a shape, a glyph, a text string a barcode, a digital watermark, symbols, notches, grooves or holes.

For instance, the capsule extraction unit is arranged to receive different types of ingredient capsules for preparing different beverages, the automatic capsule recognition arrangement being arranged to identify the type of the capsules that are being used.

Indeed, when different capsule types are likely to be used in the same extraction unit, it is not sufficient to count the number of extraction processes carried out to derive the remaining capsule stock. The types of capsules should be identified by the machine so as to provide a differentiated management system aligned to the different capsule types.

Figure 1B:
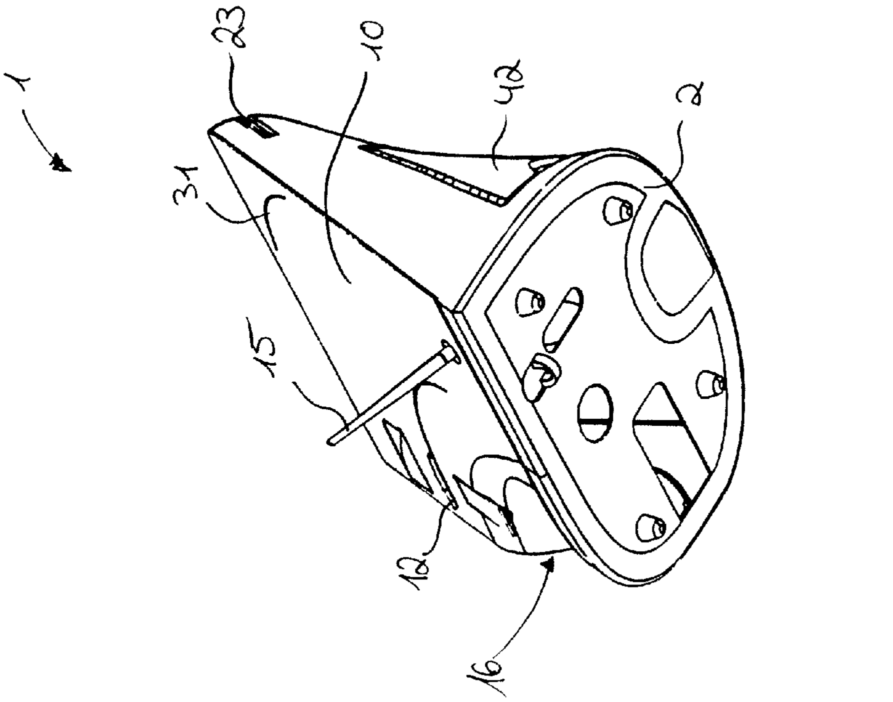
Figures 2A, 2B:
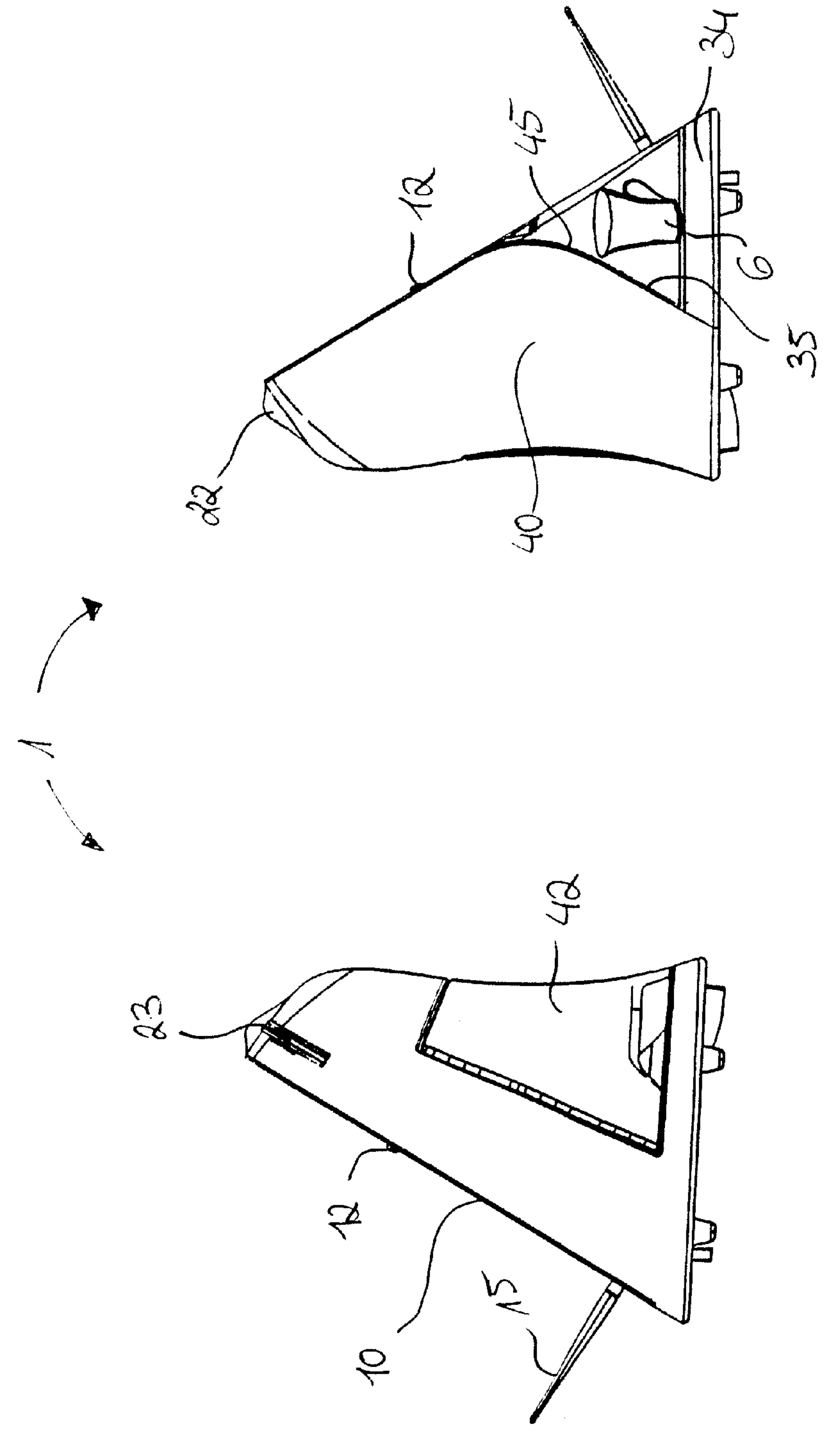

In the following with reference to FIGS. 1a, 1b, 2a and 2b the beverage preparation machine 1 according to the present invention and its basic functionalities will be described. Hereby, FIG. 1a is a perspective top view of the beverage preparation machine 1, FIG. 1b is a perspective bottom view, FIG. 2a is a side view on a first side of the beverage preparation machine 1 and FIG. 2b is a side view on the second side of the beverage preparation machine.

In the following, machine 1 will be described as a coffee preparation machine, however, it is noted that the present invention is not limited to a coffee preparation machine but comprises any other type of beverage preparation machine as previously explained.

Machine 1 has an arrangement 40 for processing one or more beverage ingredients to dispense a beverage, such as coffee. Arrangement 40 includes a reservoir 42 for liquid, preferably water, connected to a liquid circulation circuit with a pump, a heater and a coffee brewing unit, as known in the art. The brewing unit can be connected to a handle 4 pivotally mounted at the housing 3 of machine 1. Handle 4 is arranged to allow introduction, extraction and removing of a capsule containing a ground coffee. Upon extraction, capsules are evacuated to a used capsule collector after activating the handle 4 again.

Additionally, machine 1 has a top portion 36 which may be used for holding spare cups. Top portion 36 may include a heating arrangement to preheat such spare cups. The cup heater may be of the resistive type, in particular a vapour circulation cup heater as known in the art, or any other suitable heating system. A spare capsule receptacle may also be located on top portion 36 of machine 1 for storing unused capsules.

Moreover, machine 1 has an outlet 45 from which the prepared beverage is dispensed into a receptacle or cup 6 placed underneath the outlet 45, as shown for example in FIG. 2b. A drip tray arrangement 34 is provided under outlet 45, for instance of the type disclosed in EP 1 731 065. For positioning cup 6 under outlet 45, drip tray may include a positioning arrangement at its surface 14 and/or walls 35 delimiting dispensing cavity which may be positioned relative to outlet 45 to serve as references for a cup positioning, i.e. so that a cup 6 may simply be pushed against walls 35 to be properly positioned under outlet 45. Also provided is a used capsule collector (not shown in the figures) in a central part of machine 1 for collecting used, extracted capsules.

The machine further comprises a screen or display 10. Preferably, display 10 is a touch sensitive screen and may be operated by finger contact and/or with a stylus 15. Preferably, the stylus 15 when not being used can be placed into a corresponding recess 16 within the display 10 or any other part of machine 1.

Furthermore, display 10 is associated with a pair of buttons 12, for example for quick operation of machine 1 without having to access display 10. Moreover, in a preferred embodiment, display 10 includes a touch sensitive surface for navigating through pages and menus displayable on display 10.

Display 10 may be arranged to display various information and/or visual effects, as for example mentioned above, including network information when the machine is connectable to a user-network. Moreover, machine 1 may include a sound generating arrangement with loudspeakers and/or microphone and be a true multimedia interactive device, as discussed above. Machine 1 thereby may be used to contribute to the ambience.

In addition to display 10, housing 3 may in particular have a series of holes 31 on its lateral, rear and/or upper sides, in particular within display 10, for the emission of light, of various colors, to create such an ambiance. For this purpose LEDs of various colours can be provided within the holes 31.

Unlike prior art beverage preparation machines, drip tray 34, capsule receptacle and reservoir 42 are removable from machine 1, in a movement underneath to display 10 and that goes away from display 10 and/or generally parallel to the foot portion 2 of machine 1. The same applies to reservoir 42, which preferably is provided at the back of the machine beyond display 10. It follows that during use and after use, when the machine is serviced, e.g. drip tray 34 emptied, display 10 is not exposed to parts of machine 1 that might project liquid, such as liquid food or beverage, against screen 10.

Furthermore, machine 1 has a capsule inlet arrangement 32 for the supply of capsules containing an ingredient of the liquid food or beverage to be prepared, such as coffee. The capsule inlet arrangement 32 can be either provided on the lateral side of the machine or can be provided within display 10. Preferably, the capsule inlet arrangement 32 is a recess within display 10 having the shape of a capsule or any other object related to the prepared beverage.

Display 10 of the machine has not an entirely flat surface but on one side when approaching the foot portion 2, provides a recess. The recessed walls 35 of the display 10 together with the cup support 14 of the drip tray 34 thus provide a cavity 16 into which cup 6 can be placed to be filled with the beverage dispensed from outlet 45. To deemphasize the liquid food or beverage visual aspect of machine 1, walls 35 of the display 10 within the cavity 16 can be used like a normal display, so that every object and/or image displayed on display 10 extends over the cavity walls 35.

On the top portion 26 or on any other part of the machine, a touch sensor 22 can be provided enabling the user to control the machine and/or to navigate through the menu functions by carrying out a corresponding touch operation on touch sensor 22. In case that display 10 is a mere display and not a touch screen, touch sensor 22 will make the control of the machine easier and more intuitive for the user. In case that display 10 is a touch screen, then the user has the choice whether to use display 10 or touch sensor 22 for carrying out the touch operation. However, it might be advantageous to use touch sensor 22 instead of the touch screen to avoid damage or contamination on display 10.

Machine 1 can further comprise a card reader/writer 23. Card reader/writer 23 can either be a slot, into which a card can be inserted to carry out a reading and/or a writing operation on the card, card reader/writer 23 can be a wireless interface enabling a wireless communication with a card, e.g. a radio frequency identification RFID card, or a combination thereof.

In order to provide an adjusted filling of the cup, an automatic filling system with a control of the level of fill may be implemented into the machine, for instance of the type disclosed in U.S. Pat. No. 4,458,735, WO97/25634 and WO99/50172.

Figure 3:
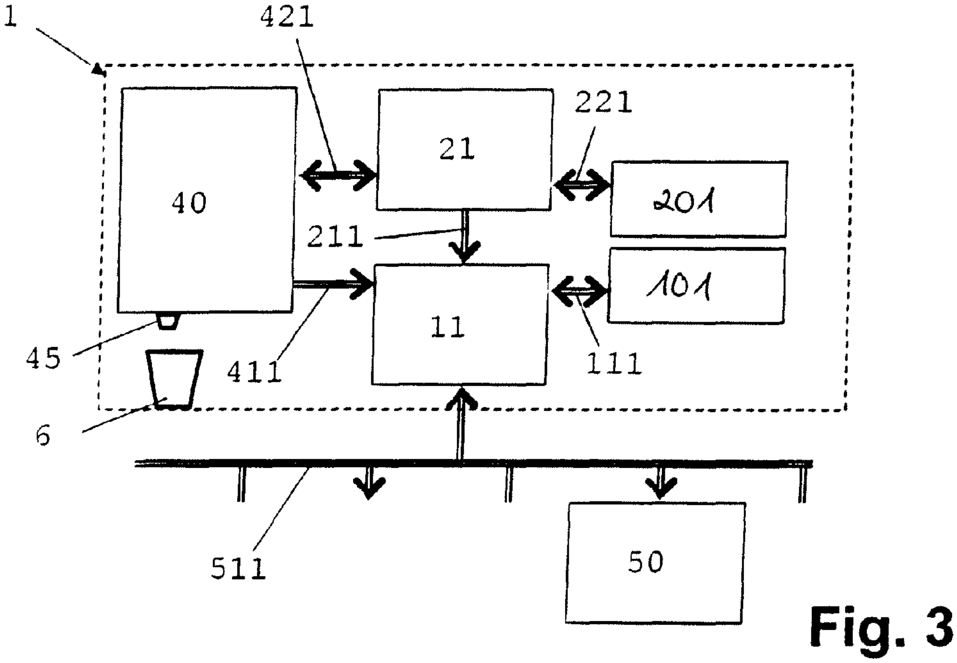
FIG. 3 shows a block diagram showing schematically the functional architecture of a beverage preparation machine according to the present invention being connected to a network.

FIG. 3 shows a functional block diagram of a beverage preparation machine 1 according to the present invention which is connected to a network 511.

Beverage preparation machine 1 includes a control unit 21 connected to a user-interface 201 via a bi-directional data communication channel 221. Control unit 21 is connected to the ingredient processing arrangement 40 for controlling the processing of the beverage ingredients. Typically, control unit 21 will control the powering of a heater and a pump and adjust the powering based on measured parameters of the beverage preparation process via sensors, such as temperature sensors, pressure sensors and flowmeters. Moreover, the control of the components of the ingredient processing arrangement 40 may be adjusted to the type of ingredient capsule extracted upon automatic recognition thereof via a capsule recognition system as known in the art, for instance an electromagnetic, mechanical, color or barcode recognition system.

Hence, ingredient processing arrangement 40 includes a series of sensors for returning information to control unit 21 relating to the state of arrangement 40 and of the beverage preparation process. Communication between control unit 21 and beverage preparation 41 is achieved via a bidirectional communication channel 421.

Furthermore, beverage preparation machine 1 has a communication module 11 for bidirectional communication with an external network 511, such as the internet or an intranet. Communication module 11 is connected to a user-interface 101, preferably in the form of the above mentioned display 10, preferably a touch screen, and possibly one or more buttons 12, via a bidirectional data communication channel 111. Display 10, e.g. a touch screen, may be operated by finger touch or by way of stylus 15.

Control unit 11, communication module 21 and ingredient processing arrangement 40 are all contained within the housing of beverage preparation machine 1.

In accordance with the invention, communication module 11 is permanently prevented from controlling the processing of the beverage ingredients. In other words, communication module 11 of beverage preparation machine 1 may not act directly or indirectly via control unit 21 on arrangement 40 or affect the beverage preparation process or other processes carried out by arrangement 40.

Control unit 21 is prevented from accepting beverage preparation-related control data from module 11.

In the architecture of FIG. 3, control unit 21 is arranged to communicate data to communication module 11 via unidirectional data communication channel 211. With the exception of a request for information and the signals necessary to ensure proper communication, e.g. data transmission control signals, control unit 21 will not receive any data from communication module 11. Conversely, the data transferred from control unit 21 to communication module 11 may relate to at least one of: the beverage preparation process; ingredient processing arrangement 40; beverage preparation settings stored in control unit 21; and/or the state of control unit 21, e.g. in the view of identifying any malfunctioning at a station 50 remotely connected to network 511.

It is also possible to connect communication module 11 directly to the sensors in the beverage preparation module 40. Likewise, communication between beverage preparation module 40 and communication module 11 is unidirectional via bus 411. However, this communication channel may become redundant if the data relating to the beverage preparation module 40 can be communicated to communication module 11 via control unit 21. Communication channel 411 is particularly useful in the absence of communication channel 211, for instance when the control unit 21 should benefit from an increased protection against network 511.

Communication module 11 is arranged to receive from said network and communicate via user-communication interface, such as display 10 and/or loudspeaker, information relating to at least one of: a need to carry out a particular service, e.g. descaling; a need to repair said machine; and information on a particular ingredient that is being processed in said machine. For such information to be sent to communication module 11, corresponding information is first gathered together by communication module 21 from control unit 21 and/or ingredient processing arrangement 40 and sent to a remote server 50 that processes and analyses the information before returning, when appropriate warnings or other information to communication module 11 via network 511.

In another embodiment, control unit 21 is prevented from communicating at all with communication module 11, not even unidirectionally. There is no data communication channel between control unit 21 and module 11.

The highest degree of safety is achieved when communication module 11 is connected neither to control unit 21 nor to beverage preparation module 40. A slightly inferior protection is achieved when communication module 11 is allowed to read, via a unidirectional channel, sensors of beverage preparation module 40. A still lower safety is obtained when communication module is allowed to obtain information from control unit 21. To ensure immunity against any upsetting of ingredient processing arrangement 40 and control unit 21 via network 511, the possibility, in particular any physical possibility, for communication module 11 to change parameters of the control unit 21 or beverage preparation unit 40 should be avoided.

As shown in FIGS. 1*a* and 1*b* beverage preparation user-interface 201 is flush with communication user-interface 101 and implemented as a combination of display 10, buttons 12, holes 31 comprising LEDs or the like, loudspeakers, microphones or the like.

A master switch for machine 1 is also provided (not shown in the figures). The master switch is arranged to connect and disconnect the powering of the various components of the beverage preparation machine, including communication module 11, control unit 21 and ingredient processing arrangement 40 all powered by the same power source, typically the mains.

Generally, communication module 11 can be arranged to receive from the network 511 and communicate via user-communication interface, such as a display 10 and/or loudspeaker, information relating to: handling of such machine 1 by a user; advertising relating to such machine 1 or related machines, accessories, and/or one or more ingredients for the beverage processing; general information relating to one or more ingredients for the beverage processing; visualization and/or music for generating an ambiance relating to said beverage or preparation thereof or consumption thereof; and news and/or weather forecast.

Figure 4:
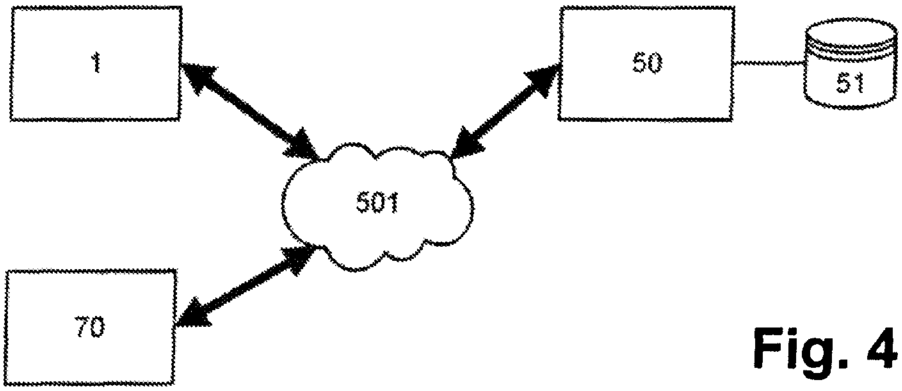
FIG. 4 shows a block diagram showing schematically the functional architecture of a network comprising a beverage preparation machine according to the present invention.

FIG. 4 shows a network comprising a machine 1 according to the present invention having network capabilities. Connected to the communication network 501 is also a server 50, which for example can be associated to a capsule supplier and/or to a service centre for machine 1. Server 50 can be further connected to a database 51 comprising data on users, capsules, machines, capsule consumption or the like. Machine 1 is hereby positioned at a customer location 150 being remote from a vendor location 550, where server 50 is positioned.

A user device 70 can further be connected to the network 501. Such a user device 70 can for example be a notebook, PC, mobile phone, PDA or any other user device having network communication capabilities.

Via user device 70 the user can for example submit data, programs or information to machine 1. For example he can load new or updated software or data into machine 1. He can also change the settings of the machine remotely. Depending on the degree of communication possibilities between control module 21 and the communication module 11, the user can also remotely start, stop or change a beverage preparation process. The user via user device 70 can also log into server 50 in order to change his personal user configurations, to submit a capsule order, to send a request for support or information or the like.

Even though in FIG. 4 the network 501 is shown as one single network connecting machine 1, server 50 and user device 70, it is also possible that the different devices communicate via one or more separate network. Any type of network can be possible including a public or a private network, for example via Bluetooth, infrared, GSM, UMTS, internet or any other type of wired or wireless communication network. Specifically, an intermediate device such as a telemetry device can be provided between machine 1 and network 501 in order to convert the corresponding data which are transmitted. The communication between respectively two of the devices, i.e. machine 1, server 50 and user device 70 can be one- or bidirectional.

The present invention provides a beverage preparation machine 1 comprising an extended user-advisory functionality as well as a computer program product for providing an extended user-advisory functionality for the beverage preparation machine 1.

The idea underlying the present invention is to aid the user in maintaining the functionality of machine 1. The present invention thus provides sort of an electronic butler, which depending on the status of the machine provides different aids to the user for keeping up the functionality of the machine 1.

The beverage preparation machine 1 according to the present invention may comprise one or more sensors for monitoring machine-related parameters, for example a temperature sensor, pressure sensor, flowmeter, electric power sensor, overheat sensor, scale sensor, water level sensor, ingredient recognition sensor or the like. Specifically, in a preferred embodiment of the present invention, machine 1 is a capsule-based beverage preparation machine 1 comprising a capsule recognition sensor for recognizing the number and/or type of consumed capsules. Optionally, the beverage preparation machine can store these parameters in a memory.

The term “machine related parameter” hereby intends to cover parameters indicating a status of the machine as well as parameters related to the beverage preparation process. One or more of these parameters can be used as indicator for an actual or upcoming event, for example an actual or upcoming disturbance, in particular a disturbance related to scaling and/or malfunction of a component of the machine 1.

Control unit 21 of machine 1 according to the present invention can further be adapted to monitor machine contextual events indicating a current context or situation of the machine and/or the surrounding of machine 1. Such a contextual event can be selected from: a particular recipe of a beverage preparation related event, a diary related event, agenda related event, an event relating to an ordering or reordering of consumables or accessories for such machine or a commercial or advertisement related thereto, and an event relating to an activity of club associated with such machine.

An actual disturbance can for example be a broken part of the machine, a missing ingredient for preparing the beverage, such as for example liquid, beverage ingredients or the like. A further actual disturbance could be any type of malfunction within the components and/or the software of machine 1.

An upcoming disturbance could be an upcoming need for descaling, another type of maintenance or an upcoming shortage of any of the ingredients needed for preparing a beverage. An upcoming disturbance could also be the fact that any of the machine parts will be consumed and the necessity will arise to exchange this machine part.

Based on the monitored machine parameters or the monitored contextual event control unit 21 is adapted to recognize an actual or upcoming event.

The beverage preparation machine 1 according to the present invention comprises a communication module 11 for communicating with a remote external device 50 via a communication network 501, 511. The communication module 11 hereby preferably is bidirectional.

In case that the control unit 21 detects an actual or upcoming event, the control unit 21 will initiate two functions: the control unit 21 will establish a connection via the communication module 11 to said external device 50 which offers a resource for managing the event and the control unit 21 will control the display of a message on display 10 of machine 1 indicating an actual or upcoming event and advising the user on managing said event.

In other words, control unit 21 is adapted to recognize an event and to search for a remote external device 50 which offers a resource for managing said event. Control unit 21 via communication module 11 will then establish a connection to this external device offering the resource for managing the event and at the same time will indicate to the user the upcoming or actual event and will advise the user on managing the event using the resource offered by the external device 50.

Communication module 11 hereby is adapted to enable communication with one or more external devices 50 offering different resources for managing events. Depending on the recognized event, control unit 21 is adapted to select one of external devices 50, which offers the most appropriate source for managing the event. If for example one external device 50 is a server of a vendor offering goods for machine 1 and another external device 50 is a server providing a help desk functionality, control unit 21 will select the server of the vendor in case that a spare for the machine and/or ingredients for the beverage preparation are needed and will select the server providing the help desk functionality in case that assistance is needed.

According to the present invention, when the event is an actual disturbance, the user does not have to search for the causes of the malfunction or for a solution to the disturbance, but rather gets a proposal how this disturbance could be removed or otherwise handled. Further, in the case of an upcoming disturbance, the user will be reminded of actions which are necessary to be taken in order to ensure a hassle-free functionality of machine 1. The user does not have the need to constantly control the machine parts, the ingredients or the like, but can rely on the help functionality which in time will provide him with an indication of an upcoming disturbance and at the same time with a proposal how this upcoming disturbance can be prevented.

The recognition of the disturbance can for example be a recognition of the need for a maintenance operation, e.g. descaling, cleaning or the like. It can also be recognizing the need for substituting a part of the machine, recognizing the need for purchasing ingredients for the beverage preparation machine, which have already been consumed or which will be reaching a shortage and/or recognizing the need for establishing a connection to a helpdesk.

In a preferred embodiment, machine 1, as already described, is adapted to determine the number and or type of consumed capsules and correspondingly control unit 21 is adapted to recognize the need for ordering a new stock of capsules. Advantageously, the control unit indicates this need of ordering a new stock of capsules prior to the moment where no capsules of this type are present anymore.

In case that machine 1 indicates an upcoming disturbance and in case that user for the moment denies the request of a resource from external device 50, control unit 21 is adapted to indicate said upcoming disturbance again to the user after a predefined time, so that the user is reminded at least once of the upcoming disturbance prior to the moment when the disturbance is already present.

A contextual event can for example be related to an agenda of a user stored within the memory of the machine. If there is an entry in the agenda, control unit 21 prior to the arrival of the corresponding date or on said date can provide possibilities how to react on the entry. If the entry is for example a birthday of a friend, it can be proposed to the user to manage such event by sending a gift, a message or a virtual or real postcard to the person.

Another example is the indication to the user of products, activities, commercials or the like associated to the machine 1 or to a club associated with the machine depending on the user's diary, the user's agenda, the currently prepared beverage or the like.

As already described control unit 21 will control the display of a message indicating the actual or upcoming event and advising the user how to manage the event using the resource from the external device. Examples of such messages and the corresponding proposed actions to manage the event are shown in FIGS. 5*a* to 5*d*. Each of the FIGS. 5*a* to 5*d* shows schematically display 10 or a part of display 10 of machine 1. The capsule insertion slot 32, LEDs, stylus 15 and other components are omitted in FIGS. 5*a* to 5*d* for the sake of clarity.

In each of the FIGS. 5*a* to 5*d*, a message 60 is shown indicating an actual or upcoming event. Furthermore, a question 61 is shown, which already makes a proposal how to manage the vent and asks the user if he wants to accomplish the corresponding steps for requesting the resources for managing the event from the external device 50. Further provided are buttons 62, 63 allowing the user to confirm the request or to deny the request.

In the embodiment shown in FIGS. 5*a* to 5*d*, the actual display mode is interrupted and the indication of the event together with the advice on managing the event is shown. Possibly, also other functionalities of the machine can be interrupted, e.g. depending on the type of event. If the event is a damage within machine 1, then it might be advantageous to immediately stop the current functionalities in order to prevent further damage. In any case, in the embodiment shown in FIGS. 5*a* to 5*d*, the indication of the event is automatically created and stops the other current display functions.

Figure 5A:
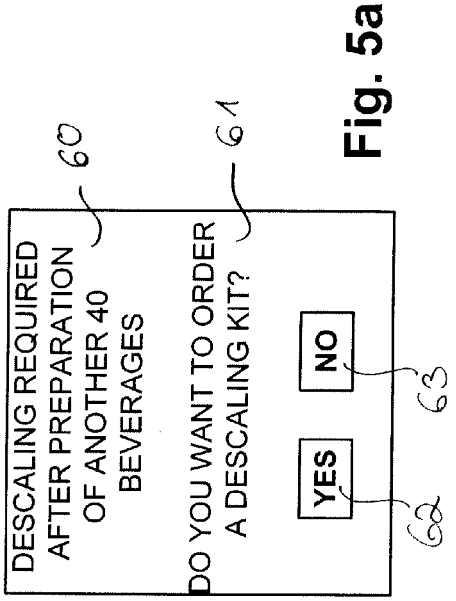
FIGS. 5*a* to 5*d* show different examples of messages displayed in accordance with the extended user-advisory functionality according to the present invention.

In FIG. 5*a*, a message 60 is shown to the user that a descaling will be required after preparation of another 40 beverages. Correspondingly, question 61 appears asking the user whether he wants to order a descaling kit. In this case, control unit 21 would set up a connection to the server of a vendor selling descaling kits for machine 1.

Figure 5B:
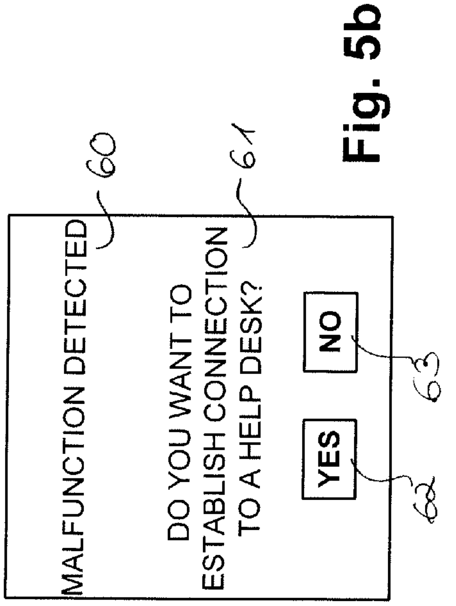

In FIG. 5*b*, a message 60 is shown which indicates that a malfunction is detected. If no concrete solution to this malfunction can be found or if the malfunction is related to a wrong operation of machine 1 by the user, then the user will be asked via question 61 whether he wants to have a connection to a helpdesk established. In this case, control unit 21 will establish a connection to a server providing help functionalities. Thereby, either a website can be displayed providing automatic proposals for removing the malfunction or, in case that the beverage machine comprises a microphone and loudspeaker(s), a communication to an assistant can be set up for providing a telephone conversation with a call center or the like in order to remove the malfunction.

Figure 5C:
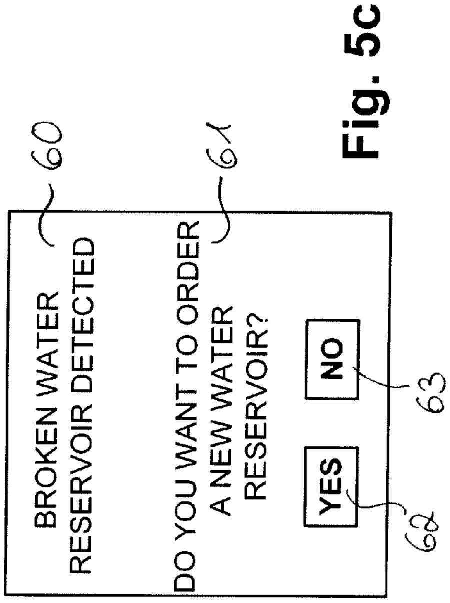

In FIG. 5*c*, a message 60 is shown indicating a broken part of the machine, for example a broken water reservoir 42. Question 61 asks the user whether he wants to order a new water reservoir 42. In this case, like in the example shown in FIG. 5*a*, control unit 21 will establish a connection to a server of a vendor selling machine parts, such as for example a water reservoir 42.

Figure 5D:
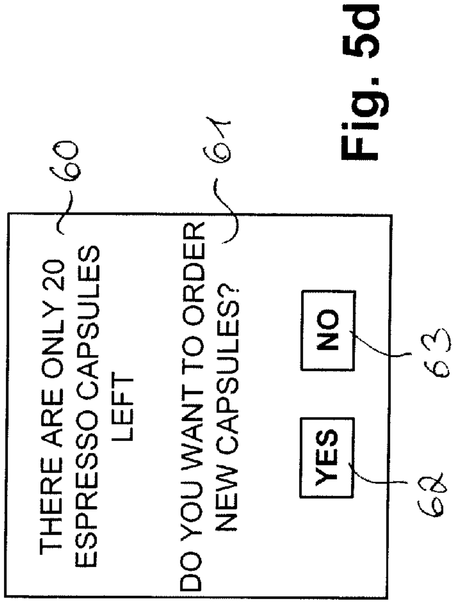

In FIG. 5*d*, a message 60 is shown indicating an upcoming shortage of capsules. For example in the case of espresso capsules, a shortage after the preparation of another 20 espressi may be indicated. Via question 61, the user is asked whether he wants to order new capsules. Also, in this case, control unit 21 will establish a connection to server 50 of a vendor selling capsules.

Figure 6A:
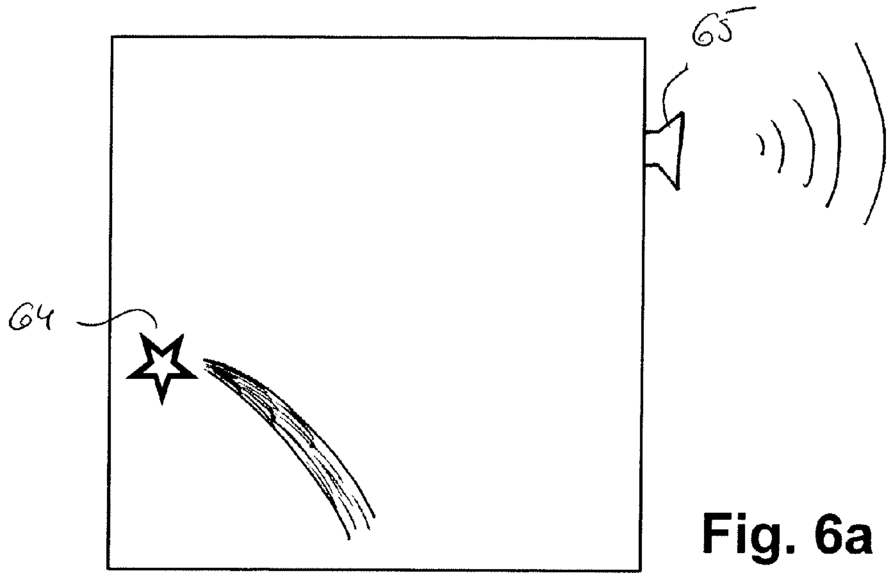
FIGS. 6*a* and 6*b* show examples of indications displayed in accordance with the extended user-advisory functionality according to the present invention.
Figure 6B:
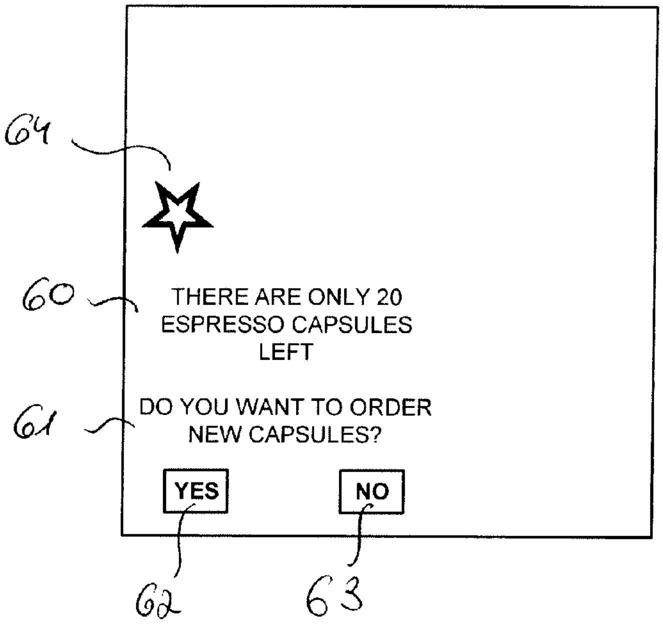

With respect to FIGS. 6*a* and 6*b*, a further embodiment for indicating to the user an actual upcoming event is shown.

In this embodiment the functionality of the machine is not interrupted at all. Only an indication is provided that there is the possibility to get a message indicating the event and indicating an advice for managing the event. This rather non-intrusive help function has the advantage, that the user is simply generally allerted when using the machine and can decide on his own whether he wants to activate and take advantage of the complete user-advisory functionality or not.

Such an indication can be an audible and/or visible indication. The indication thus can be used to invite the user to request display of a message indicating the event and giving advice on managing the event. This invitation in particular can include a generally standard visual effect identifiable by a user as characteristic of this user-advisory functionality, in particular as a characteristic symbol, such as an animated symbol for instance a rotating symbol and/or shooting star symbol, optionally rotating around the displayed message. Upon confirmation by the user, control unit 21 in the user-advisory functionality, is further adapted to display an invitation to a user to establish a connection and/or to display a message or any other indication of an event and corresponding managing of such event.

An example of such a graphical non-intrusive indication 64 is shown in FIG. 6*a*. Upon detection of an actual or upcoming event, machine 1 continues with its functionality and only displays an indication 64 to the user inviting him to use the user-advisory functionality. Schematically shown in FIG. 6*a*, a loudspeaker 65 that can be used to output a sound in addition to or instead of graphical indication 64.

If the user confirms the use of the user-advisory functionality, e.g. by pressing a button, by touching graphical indication 64 on touch screen 10 or the like, a message 60 as shown in FIG. 6*b* appears for indicating the actual or upcoming event. Optionally, at the same time, a question 61 is shown to the user indicating a way to manage the event. Hereby, the previously explained indication, e.g. shooting star 64 as shown in FIGS. 6*a* and 6*b*, can be displayed and/or reproduced in addition to message 60.

When message 60 and question 61 are displayed, the user can confirm to request the corresponding resource from external device 50. In some cases this confirmation will result in purchasing a good or in any other operation which is connected with costs for the user. In order to avoid a misuse, it can be further provided that the user has to input a user identification, which is then compared by control unit 21 with a predefined reference user identification, and only in case of a match of these user identifications, the request of the resource from external device 50 is carried out.

Hereby, two possibilities can be provided. The user can either input a user identification such as a PIN-code, a password or the like via touchpad 22, touch screen 10, buttons 12 or any other input device of machine 1. Alternatively, a user can use an identification card which can be read by card reader/writer 23 of machine 1.

The input user identification can either be compared with a reference user identification, which is stored in the memory of machine 1, or control unit 21 can submit the input user identification via communication module 11 to any external device 50 for counterchecking the user identification. External device 50 will then send a message back to machine 1 indicating whether the input user identification is a correct one.

Figure 7:
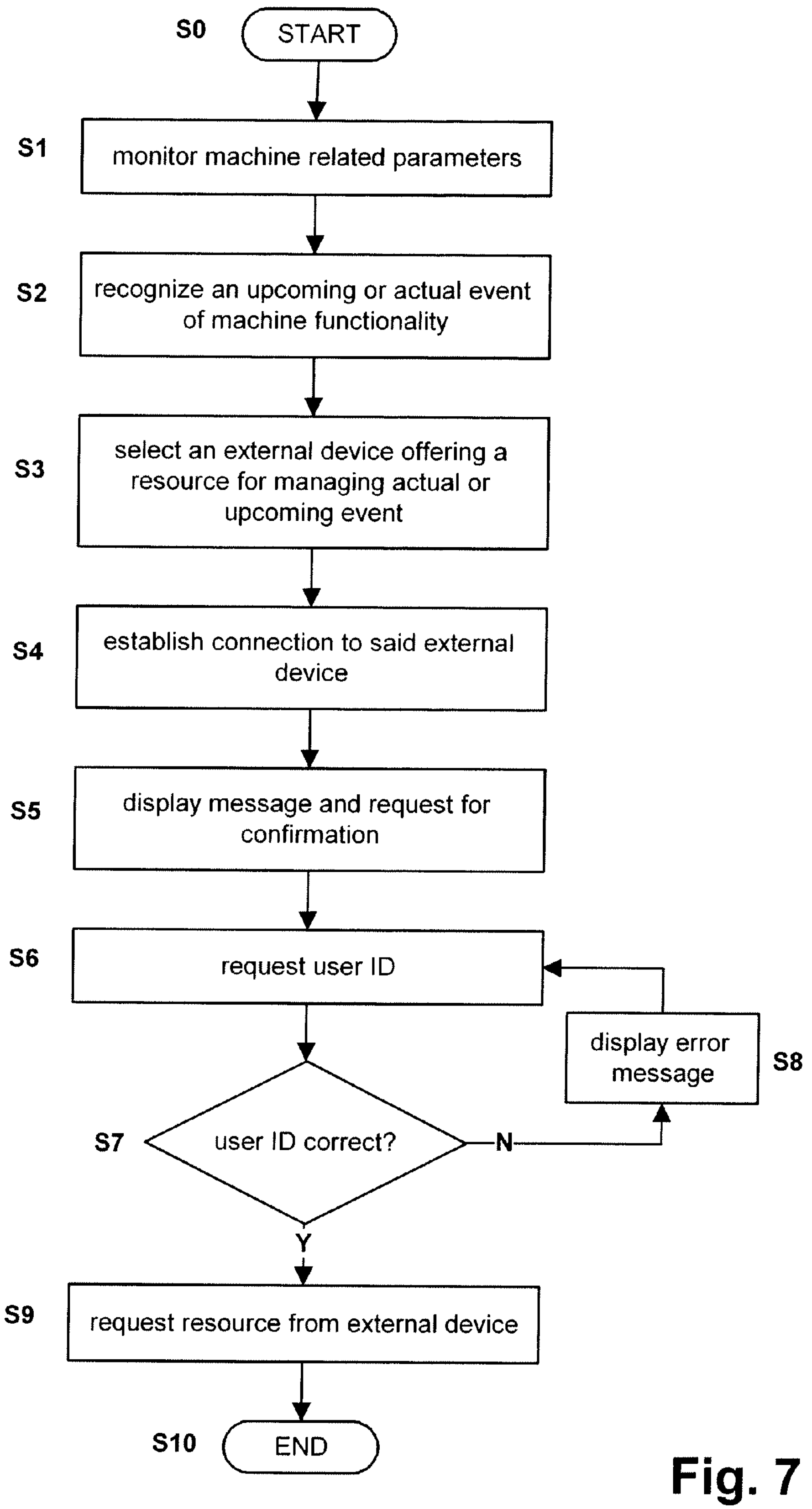
FIG. 7 is a flow chart with a schematic overview over the process steps of the method according to the present invention.

The method of the present invention will further be explained with reference to the flowchart shown in FIG. 7.

The process starts in step S0. In step S1, machine related parameters and machine context are monitored. In step S2, an upcoming or actual event is recognized.

In step S3, an external device 50 offering a resource for managing such an event is selected. In step S4, a connection is established to external device 50. In step S5, a message is displayed indicating the event with an advice on how to manage the event, e.g. a question is likewise displayed, asking the user for confirmation. Steps S4 and S5 can also be carried out in parallel or in a different order.

If and when the input of a user ID is required, then the user ID will be requested by machine 1 in step S6 and will be checked in step S7 as to its validity. If the identification of the user is positive then a request for resources for managing the event is sent to external device 50 in step S9 and a wanted data-exchange may take place. The process ends in step S10. If the user-identification turns out to be negative in step S7, an error message is displayed in step S8 and the process goes back to step S6 requesting the user ID. Alternatively, the process can also end after the false input of a user ID.

The invention claimed is:

1. A beverage preparation machine having an extended user-advisory functionality, the beverage preparation machine comprising:

an ingredient processing arrangement comprising a liquid reservoir and a brewing unit configured to allow introduction, extraction and removal of a capsule containing ground coffee, and the beverage preparation machine comprises a beverage outlet from which a beverage prepared from the capsule is dispensed;

a control unit configured to recognize an actual or upcoming event triggering the extended user-advisory functionality and configured to control powering of a heater and a pump of the beverage preparation machine;

a communication module configured to communicate with a remote external device via a communication network; and a display configured to display messages;

the control unit in the extended user-advisory functionality is adapted (i) to establish a connection via the communication module to the remote external device, the remote external device is offering a resource for managing the actual or upcoming event, and (ii) to control the display of a message on the display indicating the actual or upcoming event and advising a user on managing the actual or upcoming event, the actual or upcoming event comprises an actual or upcoming disturbance, and the actual or upcoming disturbance is a disturbance related to scaling and malfunctioning of a component of the beverage preparation machine.

2. The beverage preparation machine of claim 1, wherein the message on the display indicating the actual or upcoming event and advising the user on managing the actual or upcoming event comprises an invitation on the display to the user to establish the connection.

3. The beverage preparation machine of claim 1, comprising at least one sensor positioned in the ingredient processing arrangement and configured to monitor beverage preparation parameters, and the controlling of the powering of the heater and the pump comprises adjusting the powering based on the monitored beverage preparation parameters received by the control unit from the at least one sensor.

4. The beverage preparation machine of claim 3, wherein the at least one sensor is selected from the group consisting of a temperature sensor, a pressure sensor, a flowmeter, an electric power sensor, an overheat sensor, a scale sensor, a water level sensor, an ingredient recognition sensor and a beverage recognition sensor, and the communication module is (i) directly connected to the at least one sensor or (ii) indirectly connected to the at least one sensor by the control unit.

5. The beverage preparation machine of claim 1, wherein the control unit is adapted to establish the connection to a help desk.

6. The beverage preparation machine of claim 1, wherein the control unit is adapted to establish the connection to a gift shop and/or to a server offering electronic postcards.

7. The beverage preparation machine of claim 1, wherein the control unit is adapted to request the user to input a user identification and to accept confirmation of the request by the user only when the input user identification matches a predefined reference user identification.

8. The beverage preparation machine of claim 1, wherein the communication module is adapted to enable communication with two or more external devices, and the control unit is adapted to select the external device offering the resource to manage a detected event.

9. The beverage preparation machine of claim 1, wherein the control unit, upon a denial of the user regarding the offering of the resource from the remote external device, is adapted to remind the user of the actual or upcoming event after a predefined time.

10. The beverage preparation machine of claim 1, wherein the actual or upcoming event further comprises an additional disturbance of the beverage preparation machine based on monitored machine parameters or a machine contextual event.

11. The beverage preparation machine of claim 1, wherein the actual or upcoming event further comprises a contextual event selected from the group consisting of a particular recipe of a beverage preparation related event, a dairy related event, an agenda related event, an event relating to an ordering or reordering of consumables or accessories for the beverage preparation machine and a commercial or advertisement related thereto.

12. The beverage preparation machine of claim 1, further comprising a memory for storing an agenda or a diary.

13. The beverage preparation machine of claim 1, wherein the control unit is adapted to establish the connection to a server of a vendor offering machine related products.

14. A non-transitory computer-readable medium storing a program executable by a control unit of a beverage preparation machine for providing an extended user-advisory functionality, wherein the program, when executed, performs the steps of:

controlling powering of a heater and a pump of the beverage preparation machine;

recognizing an actual or upcoming event triggering the extended user-advisory functionality;

establishing a connection via a communication module of the beverage preparation machine to a remote external device offering a resource for managing the actual or upcoming event; and displaying a message on a display of the beverage preparation machine indicating the actual or upcoming event and advising a user on managing the actual or upcoming event, the actual or upcoming event comprises an actual or upcoming disturbance, and the actual or upcoming disturbance is a disturbance related to scaling and malfunctioning of a component of the beverage preparation machine.

15. The non-transitory computer-readable medium of claim 14, wherein the message on the display indicating the actual or upcoming event and advising the user on managing the actual or upcoming event comprises an invitation on the display to the user to establish the connection and/or display the message.

* * * * *